United States Patent Office 2,756,600
Patented July 31, 1956

2,756,600

TRANSMISSION AND POWER TAKE-OFF SYSTEM FOR MOTOR VEHICLES

Igor Kamlukin and Kenneth C. Adams, Milwaukee, Wis., assignors to Allis-Chalmers Manufacturing Company, Milwaukee, Wis.

Application March 23, 1955, Serial No. 496,167

10 Claims. (Cl. 74—15.84)

This invention relates to motor vehicles, and it is concerned more particularly with a mechanism for transmitting driving power from the vehicle engine to the propelling wheels and to a power take-off shaft on the vehicle.

It is customary to equip motor vehicles for farm and industrial uses with change speed and power take-off mechanisms and, in line with present day requirements, it is desirable that the transmission be of the quick shift, constant mesh type which permits a change from one speed ratio to another without stopping the vehicle. Operating conditions are also frequently encountered which make it desirable that driving power be delivered to the power take-off shaft irrespective of whether speed ratio changes are being made, and irrespective of whether the vehicle is in motion or standing still. In other words, a "live" power take-off is desired which may be run continuously as long as the vehicle engine is running.

In view of present day trends toward standardization, it is becoming a common practice to design various types of power take-off driven equipment for operation at speeds between 500 and 700 R. P. M. Since these speeds are much lower than the usual operating speeds of internal combustion engines, tractors and other power take-off equipped vehicles require suitable reduction gearing in the power transmission system between the engine and the power take-off shaft, in order to provide a power take-off speed within the mentioned range at normal engine speeds.

Generally, it is an object of this invention to provide an improved vehicle, such as a tractor, wherein the hereinbefore outlined requirements with respect to a quick shift transmission and live power take-off are taken care of in a practical and satisfactory manner.

More specifically, it is an object of this invention to provide an improved transmission and power take-off system incorporating a constantly energized gear train and an associated control mechanism for connecting said gear train in driving relation with a change speed transmission and with a power take-off shaft, the arrangement being preferably such that the change speed transmission and power take-off shaft may be supplied with power either separately or conjointly at the will of an operator.

A further object of this invention is to provide a transmission and power take-off system of the hereinbefore described character wherein the power take-off shaft may be continuously supplied with driving power, particularly during shift intervals, that is, while speed ratio changes are being made in the transmission.

Another object of this invention is to provide a transmission and power take-off system of the hereinabove outlined character wherein an input element of the change speed transmission may be driven in one direction by connecting it to an input element of the constantly energized gear train, and wherein the input element of the change speed transmission may be driven in a reverse direction by connecting it to the output element of the constantly energized gear train.

Still another object of this invention is to provide an improved transmission and power take-off system of the hereinbefore outlined character wherein the direction of rotation of the transmission input element may be reversed without reversing the direction of rotation of the power take-off shaft.

The foregoing and other objects and advantages are attained by the present invention, various novel features of which will become apparent as the following specification is read in conjunction with the accompanying drawings wherein.

Figure 1:
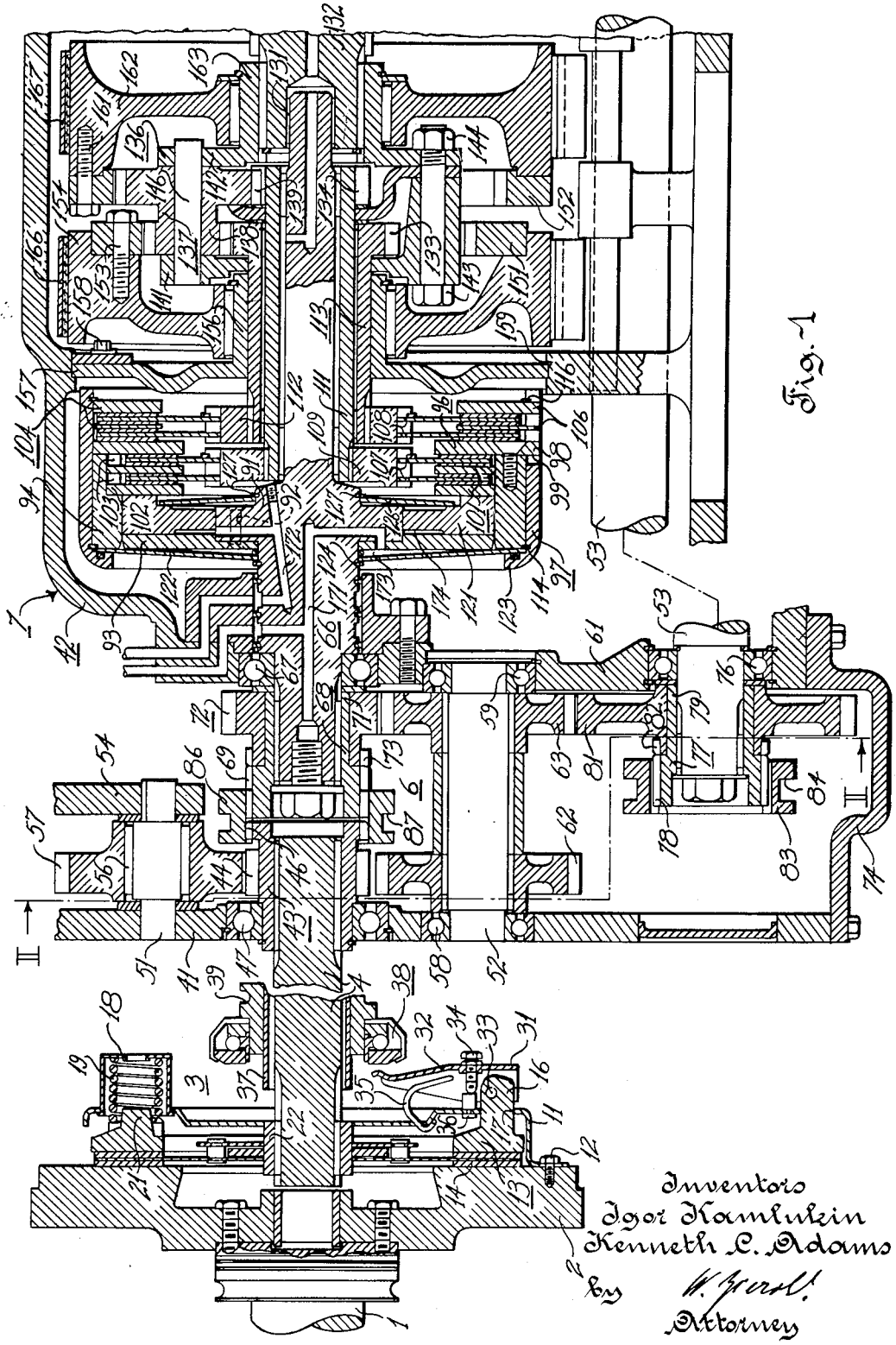
Fig. 1 is a vertical longitudinal section of a power transmitting mechanism for motor vehicles including change speed and power take-off shaft drive gearing.

Referring to Fig. 1, a conventional engine crank shaft 1 of a motor vehicle is driven by an internal combustion engine (not shown) and has a rearward end portion secured to an engine flywheel 2. An engine clutch assembly, generally indicated at 3, is operative to selectively establish and interrupt a driving connection between the crank shaft 1 and a drive shaft 4. The drive shaft 4, which has been shortened in the drawing, extends rearwardly from the engine clutch assembly 3 to a constantly energized gear train 6 and a quick shift planetary transmission 7 located at the rearward end of the vehicle.

The engine clutch assembly 3 is the conventional kind used to couple an engine crank shaft with the change speed transmission of a motor vehicle. Referring to Fig. 1, detachably secured by bolts 12 to the engine flywheel 2 is a clutch carrier plate 11. Interposed between the flywheel 2 and carrier plate 11 are an annular pressure plate 13 and a driven clutch plate 14. Three lugs 16 spaced equidistantly about the periphery of pressure plate 13 and projecting rearwardly from the pressure plate extend through registering slots 17 formed in the carrier plate 11 so that annular pressure plate 13 will be driven by carrier plate 11 and engine flywheel 2. A series of coil spring retainer cups 18 protruding through and tightly held by carrier plate 11 in the peripheral spaces between slots 17 in the carrier plate form seats for a series of compression coil springs 19. Each coil spring 19 has its other end encircling a raised nub portion 21 of pressure plate 13, and these coil springs furnish the pressure for engagement of the clutch assembly by bearing against the outer lateral surfaces of pressure plate 13. Driven clutch plate 14 is spline connected to drive shaft 4 by hub 22 so that torque is transmitted from flywheel 2 and pressure plate 13 to driven clutch plate 14 and drive shaft 4 whenever driven clutch plate 14 is clamped between the flywheel and the pressure plate by coil springs 19.

To disengage the clutch assembly 3, a release lever 31 having a radially inwardly projecting arm 32 is pivotally mounted on each of the projecting lugs 16 by means of a pivot pin 33. An adjustable bolt 34 secured to these release levers and spaced on the levers radially inwardly from pivot pin 33 has a projecting end portion abutting a stud 36 fixed to the carrier plate 11. Pivoting of release lever 31 about the fulcrum formed by stud 36 and bolt 34, when arm 32 of the release lever is moved inwardly toward the left in Fig. 1, moves pivot pin 33 and the pressure plate 13 to the right as viewed in Fig. 1 against the pressure of coil springs 19, and in so doing disengages the clutch assembly. Spring clips 35 anchored in carrier plate 11 and release lever 31 serve to pull arm 32 of the release lever inwardly and insure constant contact of bolt 34 with stud 36. A stationary sleeve section 37 is fixed to the vehicle support structure and mounts an axially back and forth shiftable thrust bearing assembly 38 rearwardly of the clutch release lever arms 32, movement of the bearing assembly 38 into and out of engagement with these arms being effective to release and engage the engine clutch in a conventional manner. A suitable lever mechanism (not shown) engaging an annular groove 39 on the thrust bearing assembly 38 is used to slide the thrust bearing assembly against arm 32 of the clutch release lever.

Referring to Fig. 1, drive shaft 4 has a rearward end portion extending into the forward wall 41 of a transmission housing generally shown at 42. The rear end of the drive shaft 4 projects into and is spline connected with a combined gear and clutch sleeve 43 having a gear section 44, and a circumferential series of clutch teeth 46 at its rear end. Sleeve 43 is rotatably supported within the housing 42 in bearing 47 and in this manner supports the rear end of drive shaft 4.

Figures 2, 3:
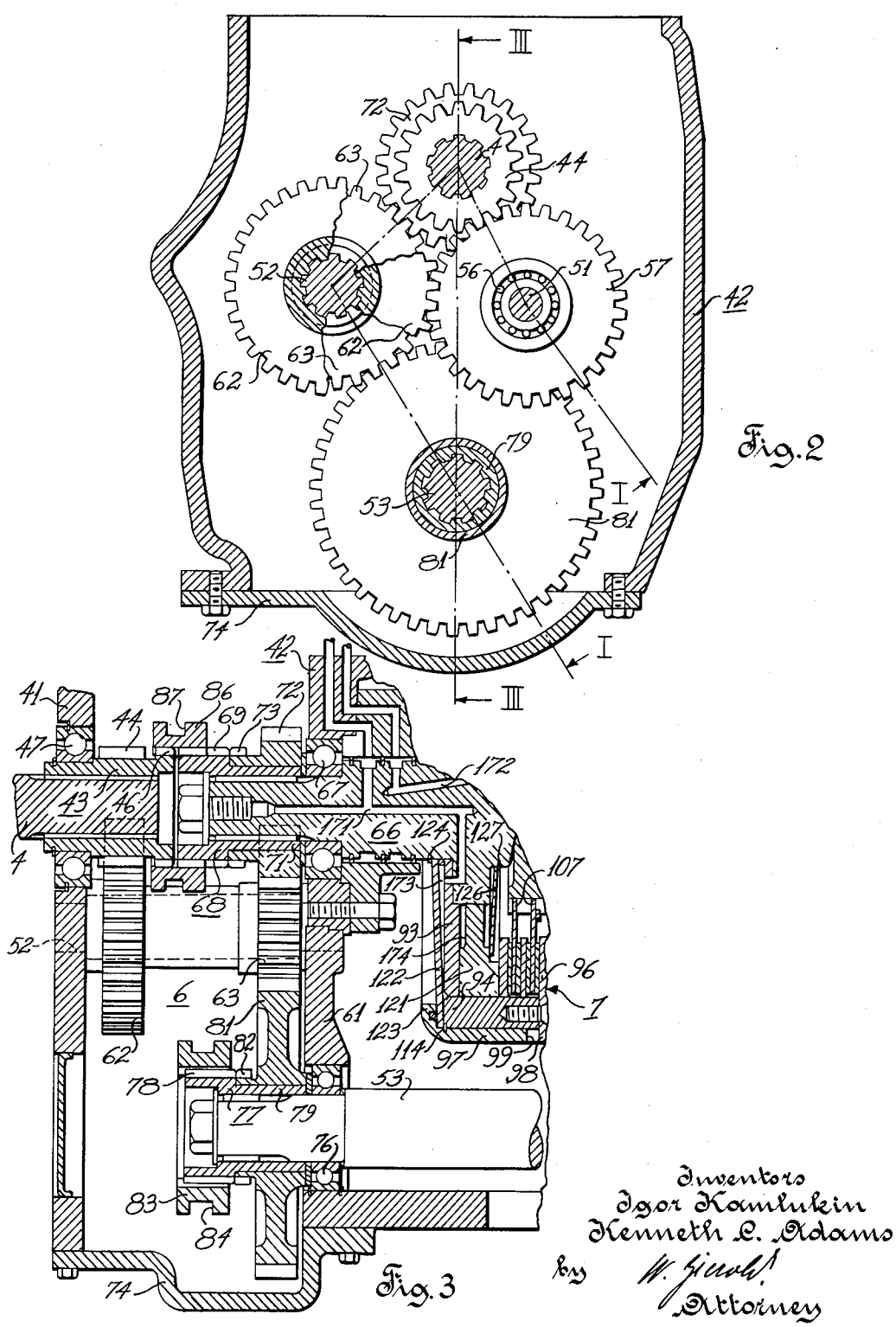
Fig. 2 is a vertical transverse section of the mechanism shown in Fig. 1, the view of Fig. 2 being taken along line II—II of Fig. 1.
Fig. 3 is a vertical longitudinal section of the mechanism shown in Figs. 1 and 2, the view of Fig. 3 being taken along line III—III of Fig. 2.

As can be seen in Fig. 2, below drive shaft 4 and parallel to the drive shaft are two countershafts 51 and 52, and a power take-off shaft 53. These shafts are transversely spaced from each other as shown in Fig. 2, however, for purposes of clarity, these countershafts and the drive shaft 4 as shown in Fig. 1 are hypothetically positioned in a common plane along line I—I in Fig. 2. Referring to Fig. 1, countershaft 51 has its ends fixedly supported in forward wall 41 of the transmission housing 42 and in an inner wall portion 54 of the housing 42. Rotatably mounted about countershaft 51 on a bearing 56 is a reverse idler 57 constantly in mesh with spur gear section 44 of sleeve 43.

Countershaft 52 is rotatably supported at its ends in ball bearings 58 and 59 mounted in the forward transmission wall 41 and in an intermediate transmission wall 61, respectively. At opposite ends of countershaft 52 and spline connected for rotation therewith are two countergears 62 and 63. Countergear 62 is constantly in mesh with reverse idler 57, so that rotation of drive shaft 4 causes rotation of reverse idler 57 and also of the double section gear assembly comprising countergear 62, shaft 52 and countergear 63.

Referring to Figs. 1 and 3, power take-off shaft 53 is positioned within the transmission adjacent a bottom wall 74 of the transmission housing 42, and extends rearwardly within the transmission housing 42 and beneath the planetary transmission 7 to the rear of the transmission housing 42 where it is supported at its rear end by a suitable bearing (not shown). The forward end of power take-off shaft 53 is rotatably supported in intermediate wall 61 by a bearing 76. Splined at the forward end of the power take-off shaft in front of housing wall 61 is a sleeve 77 having a circumferential series of clutch teeth 78 and a radially reduced journal portion 79. A power take-off ring gear 81 having a circumferential series of clutch teeth 82 is rotatably mounted on journal portion 79 of sleeve 77. Ring gear 81 is constantly in mesh with countergear 63 of double section gear assembly 62, 52, 63. A shiftable clutch collar 83 containing an annular groove 84 is slidably mounted on clutch teeth 78 of sleeve 77 and can be moved rearwardly from the position shown in Fig. 1 to engage clutch teeth 82 of ring gear 81. This can be done by any suitable lever mechanism (not shown) engaging annular groove 84.

Axially aligned with and to the rear of driving shaft 4 is a transmission input shaft 66 rotatably mounted in intermediate wall 61 of the transmission by means of a ball bearing 67. Splined on the forward end of the input shaft is a sleeve 68 having a circumferential series of clutch teeth 69 and a radially reduced journal portion 71. A ring gear 72 constantly in mesh with countergear 63 on shaft 52 and having a circumferential series of external clutch teeth 73 is rotatably mounted on journal portion 71. A forward and reverse selector collar 86 containing an annular groove 87 is slidably mounted on clutch teeth 69 of sleeve 68 and can be moved forwardly to the position shown in Fig. 1 to engage clutch teeth 46 of gear and clutch sleeve 43; or rearwardly to engage clutch teeth 73 of gear 72. An actuating mechanism (not shown) may include a shift fork engaging groove 87 of collar 86 to effect axial back and forth adjustment of the selector collar 86.

From the foregoing, it is apparent that the gear and clutch sleeve 43 forms the input element, and ring gear 72 forms the output element of a gear train, the intermediate gearing of which comprises idler gear 57 and the double section gear assembly 62, 52, 63, said gear train being constantly energized by the drive shaft 4 by reason of the spline connection between gear and clutch sleeve 43 and the drive shaft 4. A control means, comprising the forward and reverse selector collar 86, is operable to couple the input shaft 66 with the drive shaft 4 so that both shafts will rotate in the same direction, such coupling being effected by moving collar 86 forwardly to engage clutch teeth 46 of the input element 43. Adjusting collar 86 rearwardly to engage clutch teeth 73 of ring gear 72 will cause input shaft 66 to rotate in a direction opposite to that of drive shaft 4 and at approximately the same rate of speed as that of the drive shaft 4. Such reverse drive to input shaft 66 will be through drive shaft 4, gear section 44, reverse idler 57, double section gear assembly 62, 52, 63, ring gear 72, collar 86 and sleeve 68. Independently of the position of the collar 86 and the drive to input shaft 66, clutch collar 83 may be shifted rearwardly from the position shown in Fig. 1 to engage clutch teeth 82 of power take-off ring gear 81 so that drive will be transmitted from the constantly energized double section gear assembly 62, 52, 63 to the power take-off shaft through ring gear 81.

Transmission input shaft 66 transmits power to a constant mesh planetary transmission utilizing friction devices within the transmission to selectively establish a drive connection at different output ratios between the transmission input shaft and the traction wheels of the vehicle. The transmission comprises in general two rearwardly located planetary gear trains, a forwardly located double clutch assembly supplying input power to the planetary gear trains, and selectively operable brakes for the reaction elements of the planetary gear trains.

Referring to Fig. 1, integrally formed on the input shaft 66 to the rear of the intermediate housing wall 61 is a clutch support flange 91. Secured to flange 91 by rivets 92 is an inner clutch drum assembly comprising a radial wall 93, a peripheral wall 94 welded to the outer edge of wall 93, and an annular backing plate 96 secured to the peripheral wall 94 and projecting radially inward of the latter. Slidably mounted for back and forth axial movement on the peripheral wall 94 of the inner clutch drum assembly 93, 94, 96 is an outer clutch cylinder 97. Tongue portions 98 of backing plate 96 extend into slots 99 formed in the clutch cylinder 97 so that the latter rotates in unison with inner clutch drum assembly 93, 94, 96.

Extending radially inward from the peripheral wall 94 of the inner clutch drum assembly are a pair of annular front clutch friction disks 101 which rotate with the inner clutch drum assembly by reason of tongue portions 102 of disks 101 extending into axial grooves 103 on the inner side of peripheral wall 94. A similar pair of rear clutch friction disks 104 extend inwardly from clutch cylinder 97 with tongue portions 106 of disks 104 extending through slots 99 of clutch cylinder 97. Interposed between front clutch friction disks 101 and backing plate 96 and between rear clutch friction disks 104 and backing plate 96 are front clutch driven plates 107 and rear clutch driven plates 108, respectively. Front clutch driven plates 107 are slidably secured to a hub 109 splined to a rotatably mounted inner quill shaft 111. Similarly, rear clutch driven plates 108 are slidably secured to a hub 112 splined to a rotatably mounted outer quill shaft 113.

As shown in Fig. 1, clutch cylinder 97 has inner front and rear snap rings 114 and 116, respectively, secured to it at axially opposite ends. These snap rings are placed a sufficient axial distance apart to allow outer clutch cylinder 97 a limited amount of axial sliding movement relative to the peripheral inner drum wall 94, backing plate 96 and rear clutch friction disks 104, all contained within the space bounded by the snap rings 114 and 116. Movement of outer clutch cylinder 97 to the left in Fig. 1 forces snap ring 116 against rearmost friction disk 104 clamping rear clutch driven plates 108 between backing plate 96 and the rear friction disks 104, while movement of outer clutch cylinder 97 to the right in Fig. 1 releases clutch plates 108 from backing plate 96 and rear friction disks 104.

Within the inner clutch drum assembly 93, 94, 96 an annular clutch piston 121 is rotatably mounted about input shaft 66 and has a limited amount of axial sliding movement toward and away from inner drum radial wall 93. Movement of clutch piston 121 to the right in Fig. 1 clamps front clutch driven plates 107 between front clutch friction disks 101 and backing plate 96, while movement of clutch piston 121 to the left releases the front clutch.

For releasing rear clutch driven plates 108 from engagement between backing plate 96 and rear friction disks 104, a conical spring washer 122, commonly known as a Belleville washer, is mounted on input shaft 66 with its outer annular edge flexibly sealed between snap ring 114 and a shoulder 123 of outer clutch cylinder 97. In the condition of the mechanism as shown in Fig. 1, the Belleville washer 122 tends to increase its conicity by axial movement of its annular edge adjacent snap ring 114 toward the right with respect to its inner annular edge which is adjacent a snap ring 124 secured to input shaft 66. The inner edge of washer 122 is restrained from longitudinal movement to the left along shaft 66 as viewed in Fig. 1 by snap ring 124, and clutch cylinder 94 takes up axial thrust to the right at the outer edge of washer 122. When the rear clutch 108, 96 is disengaged, washer 122 urges outer clutch cylinder 97 to its right limit position determined by the outer edge of washer 122 striking the inner clutch drum assembly 93, 94, 96. In this position rear clutch driven plates 108 are then free to rotate with respect to backing plate 96 and rear clutch friction disks 104.

Another Belleville washer 126 is positioned within the inner clutch drum assembly 93, 94, 96 in a preloaded condition so that as viewed in Fig. 1, its outer edge tends to move toward the left with respect to its inner edge. The inner edge of the washer 126 is restrained from axial movement to the right along input shaft 66 by a snap ring 127 secured to the input shaft 66. The outer edge of washer 126 bears against clutch piston 121 urging the piston to the left. When the front clutch 107, 96 is disengaged, washer 126 will urge clutch piston 121 to its left limit position determined by piston 121 striking inner drum radial wall 93. In this position front clutch driven plates 107 are free to rotate with respect to backing plate 96 and front clutch friction disks 101.

Referring again to input shaft 66, the rear end of this shaft is piloted by a needle bearing 131 in a rotatable, axially aligned output shaft 132. The shaft 132 extends to the rear of the transmission housing and represents a variable speed shaft for driving traction wheels (not shown) of a vehicle in conventional manner. A double planetary gear system together with the double clutch described hereinbefore provides a driving connection at different output speed ratios between the input shaft 66 and the output shaft 132.

Quill shaft 113 has integrally formed at its rear end a sun gear 133 and quill shaft 111 has integrally formed at its rear end a smaller sun gear 134. In mesh with these sun gears and rotatably supported upon a planet carrier 136 are three double section planet pinions 137 arranged in a circle about shaft 66 and spaced 120° apart from each other. Each planet pinion has a front section 138 meshing with sun gear 133 and an integrally formed rear section 139 meshing with sun gear 134. The planet carrier 136 is spline connected with the output shaft 132 at the forward end of the latter and comprises two oppositely disposed radial walls 141 and 142, fastened together by bolts 143 and nuts 144. Pins 146 extend between walls 141 and 142 for rotatably supporting the planet pinions 137.

Planet sections 138 mesh with gear teeth on the inner periphery of a front annulus gear 151, and planet sections 139 mesh with gear teeth on the inner periphery of a rear annulus gear 152. Annulus gear 151 is securely fastened by screws 153 to a front brake drum 154 which is rotatably mounted on a central hub sleeve 156 of a radial partition plate 157 detachably fastened to the transmission housing by bolts 158 and snap ring 159. Annulus gear 152 is securely fastened by screws 161 to a rear brake drum 162 rotatably mounted on a hub sleeve 163 of planet carrier wall 142. Brake bands 166 and 167 are wrapped around the front brake drum 154 and rear brake drum 162, respectively, and are operable by suitable actuating mechanisms (not shown) to selectively secure the brake drums 154 and 162 against rotation.

Hydraulic pressure fluid is used for engaging the hereinbefore described clutch and brake assemblies. To that end, a pair of drilled passages 171 and 172 in input shaft 66 communicate, respectively, with a chamber 173 between spring washer 122 and radial wall 93, and with a chamber 174 between clutch piston 121 and radial wall 93. When pressure fluid from any suitable source (not shown) is admitted to passage 172, clutch piston 121 is forced to the right as seen in Fig. 1 clamping front clutch driven plates 107 between front clutch friction disks 101 and backing plate 96 so that clutch driven plates 107 and quill shaft 111 will rotate with the inner clutch drum assembly. Admitting pressure fluid through passage 171 to chamber 173 flattens resilient washer 122 and forces outer clutch cylinder 97 to the left in Fig. 1, and in so doing clamps rear clutch driven plates 108 between rear clutch friction disks 104 and backing plate 96 so that clutch driven plates 108 and quill shaft 113 will rotate with the outer clutch cylinder 97.

The brake assemblies may be actuated by conventional hydraulically operated piston cylinder devices (not shown) which are connected, respectively, to the brake bands 166 and 167 so that the bands may be selectively tightened about drums 154 and 162 upon actuation of the proper hydraulic piston cylinder device.

The herein disclosed transmission provides five selectable speed ratios, any one of which is available for either forward or reverse drive depending upon the position of the forward and reverse selector collar 86 previously described. These five speed ratios are available by actuating different combinations of the clutches and brakes within the transmission. A neutral condition is attained wherein there is no drive connection between the transmission input shaft 66 and the output shaft 132 when both clutches are disengeged, or when one of the clutches and both brakes are disengaged. The five speed ratios which can be obtained in the transmission are as follows:

*Low or first.*—Front clutch 107, 96 and front brake 166, 154 are engaged, and rear clutch 108, 96 and rear brake 167, 162 are disengaged. Rear sun gear 134 rotates in unison with transmission input shaft 66 and front sections 138 of the planet pinions roll on the braked annulus gear 151. As a result, planet carrier 136 and output shaft 132 rotate in the same direction as but at a slower speed than the input shaft 66.

*Second.*—Front clutch 107, 96 and rear brake 167, 162 are engaged, and rear clutch 108, 96 and front brake 166, 154 are disengaged. Rear sun gear 134 rotates in unison with transmission input shaft 66 and rear sections 139 of the planet pinions roll on the braked annulus gear 152. As a result, planet carrier 136 and output shaft 132 rotate in the same direction as but at a slower speed than input shaft 66, the speed ratio between the input and output shafts now being lower than when the transmission was in low gear.

*Third.*—Rear clutch 109, 96 and front brake 166, 154 are engaged, and front clutch 107, 96 and rear brake 167, 162 are disengaged. Front sun gear 133 rotates in unison with transmission input shaft 66 and front sections 138 of the planet pinions roll on braked annulus gear 151. As a result, carrier 136 and output shaft 132 rotate in the same direction as input shaft 66, but at a higher speed than when the transmission was in second gear.

*Fourth.*—Rear clutch 108, 96 and rear brake 167, 162 are engaged and front clutch 107, 96 and front brake 166, 154 are disengaged. Front sun gear 133 rotates with the drive shaft 66, and rear sections 139 of the planet pinions roll on braked annulus gear 152. Planet carrier 136 and output shaft 132 rotate in the same direction as the input shaft 66, but at a higher speed than when the transmission was in third gear.

*Fifth.*—Both clutches 107, 96 and 108, 96 are engaged and both brakes 166, 154 and 167, 162 are disengaged. Both sun gears 133 and 134 will rotate in unison with input shaft 66. The planet pinions 137 are unable to rotate relative to the carrier, and as a result, the carrier, output shaft and annulus gears rotate as a unit in the same direction and at the same speed as the input shaft 66.

As hereinbefore described, these five gear ratios become available for reverse drive when selector collar 86 is shifted into engagement with clutch teeth 73 of ring gear 72 and power transmission is from the drive shaft 4 through the constantly energized gear train 6 including ring gear 72. The gear train 6 may be proportioned to afford a gear ratio which is equal to unity, or if the reverse speeds are desired to be slower than the corresponding forward speeds, the ratio of the gear train 6 may be larger.

From the foregoing, it is apparent that the power transmitting means comprising the constant mesh planetary transmission 7 and the selector collar 86 is operable to connect the drive shaft 4 with the output shaft 132 for drive in either forward or reverse as determined by the adjusted position of collar 86, and at a number of different speed ratios as determined by the operation of the planetary transmission 7. Since variable speed ratios and a neutral condition are both attained by appropriate control of the clutches and brakes in the transmission, power output to the traction wheels of a vehicle equipped with the herein disclosed power take-off and transmission system can readily be controlled by proper operation of the clutches and brakes within the transmission and without the necessity of disengaging the engine clutch of the vehicle. For this reason, the constantly energized gear train 6 will constantly drive the power take-off gear 81 whenever the engine clutch is engaged and irrespective of whether speed ratio changes are being made and irrespective of whether the vehicle is standing still or in motion. Sliding clutch collar 83 permits the power take-off shaft to be selectively connected with or disconnected from the gear train 6 independently of the position of the selector collar 86 and the drive of transmission input shaft 66.

In addition, by driving the power take-off shaft from a gear train present in the transmission to afford forward or reverse drive, reduction gearing has been introduced between the drive shaft and the power take-off shaft so that the power take-off shaft is driven at a speed considerably lower than the speed of the drive shaft. By driving the power take-off shaft from the double section gear assembly 62, 52, 63, it is possible to position the power take-off shaft below the transmission at a height above the ground where it is most readily accessible for use with power operated equipment.

The provision of the engine clutch 3 between the engine crank shaft 2 and the drive shaft 4 allows the drive shaft 4 to be disconnected from the engine crank shaft preparatory to shifting of the collars 83 and 86, so that the selector collar 86 may be adjusted for forward or reverse drive, and the clutch collar 83 may be adjusted to connect the power take-off shaft to or disconnect it from the power take-off gear 81 and gear train 6 without the necessity of stopping the engine. The provision of the engine clutch 3 is also an important safety feature, as frequently with present day equipment it is advantageous if the power supply to all the power outlets on a vehicle can be interrupted simultaneously. Since in the present invention the power take-off shaft and the traction wheels both receive power from gear train 6, disengaging the engine clutch interrupts the power flow to both these power outlets.

While we have described only one particular embodiment of our invention, it should be understood that we do not wish to be restricted thereto and that we intend to cover all modifications of the invention which would be apparent to one skilled in the art and that come within the scope of the appended claims.

It is claimed and desired to secure by Letters Patent:

1. In a transmission and power take-off system for motor vehicles having traction means and a power take-off shaft; the combination of a drive shaft; a change speed transmission having a power input shaft and a variable speed output shaft for driving said traction means; mounting means positioning said power take-off shaft for rotation on an axis in radially spaced relation to the axis of said drive shaft; a gear train including an input element connected in driven relation with said drive shaft, an output element in rotatable relation to said transmission input shaft, and intermediate gearing connecting said input element in driven relation with said output element; control means operable to connect said transmission input shaft in driven relation, selectively, with said input or output element of said gear train; and additional means connecting said power take-off shaft in driven relation with said intermediate gearing.

2. In a transmission and power take-off system for motor vehicles having traction means and a power take-off shaft; the combination of a drive shaft; a change speed transmission having a power input shaft and a variable speed output shaft for driving said traction means; mounting means for positioning said power take-off shaft for rotation on an axis in radially spaced relation to the axis of said drive shaft; an input element connected in driven relation with said drive shaft; an output element in rotatable relation to said transmission input shaft; an idler gear rotatably carried by said mounting means in mesh with one of said elements; a double section gear unit rotatably carried by said mounting means for rotation about an axis in radially spaced relation to the axis of said drive shaft, one section of said gear unit in mesh with said idler gear and the other section of said gear unit in mesh with the other of said elements; control means operable to connect said transmission input shaft in driven relation, selectively, with said input or output element; and additional means connecting said power take-off shaft in driven relation with said double section gear unit.

3. The combination set forth in claim 2 wherein said additional means comprises a power take-off gear in driven relation with said double section gear unit and clutch means operable to connect said power take-off shaft in driven relation with said power take-off gear.

4. In a transmission and power take-off system for motor vehicles having traction means and a power take-off shaft; the combination of a drive shaft; an output shaft for driving said traction means; mounting means positioning said power take-off shaft for rotation on an axis in radially spaced relation to the axis of said drive shaft;

a gear train including an input element connected in driven relation with said drive shaft and an output element in rotatable relation to said output shaft; power transmitting means operable to connect said output shaft in driven relation selectively with said input or output elements of said gear train, said power transmitting means including frictionally engaged clutch means whereby power is conveyed to said output shaft through said frictionally engaged clutch means; and additional means connecting said power take-off shaft in driven relation with said gear train independently of said power transmitting means.

5. In a transmission and power take-off system for motor vehicles having a traction means and a power take-off shaft; the combination of a drive shaft; relatively rotatable transmission input and output shafts; means including a friction clutch for selectively establishing and interrupting a driving connection between said transmission input and output shafts; mounting means positioning said power take-off shaft for rotation on an axis in radially spaced relation to the axis of said drive shaft; a gear train including an input element connected in driven relation with said drive shaft and an output element in rotatable relation to said transmission input shaft; control means operable to connect said transmission input shaft in driven relation, selectively, with said input or output element of said gear train; and additional means connecting said power take-off shaft in driven relation with said gear train independently of said transmission input shaft.

6. In a transmission and power take-off system for motor vehicles having a traction means and a power take-off shaft; relatively rotatable transmission input and output shafts; means including a friction clutch for selectively establishing and interrupting a driving connection between said transmission input and output shafts; mounting means positioning said power take-off shaft for rotation on an axis in radially spaced relation to the axis of said drive shaft; an input element connected in driven relation with said drive shaft; an output element in rotatable relation to said transmission input shaft; an idler gear rotatably carried by said mounting means in mesh with one of said elements; a double section gear unit rotatably carried by said mounting means for rotation about an axis in radially spaced relation to the axis of said drive shaft, one section of said gear unit in mesh with said idler gear and the other section of said gear unit in mesh with the other of said elements; control means operable to connect said transmission input shaft in driven relation, selectively, with said input or output element; and additional means connecting said power take-off shaft in driven relation with said double section gear unit.

7. In a transmission and power take-off system for motor vehicles having traction means and a power take-off shaft; the combination of a drive shaft; a constant mesh change speed transmission having a power input shaft and a variable speed output shaft for driving said traction means, said transmission including friction devices operable to establish a variable speed driving connection between said input and output shafts when said friction devices are selectively engaged; mounting means positioning said power take-off shaft for rotation on an axis in radially spaced relation to the axis of said drive shaft; a gear train including an input element connected in driven relation with said drive shaft and an output element in rotatable relation to said transmission input shaft; control means operable to connect said transmission input shaft in driven relation, selectively, with said input or output element of said gear train; and additional means connecting said power take-off shaft in driven relation with said gear train independently of said transmission input shaft.

8. In a transmission and power take-off system for motor vehicles having traction means and a power take-off shaft; the combination of a drive shaft; a constant mesh change speed transmission having a power input shaft and a variable speed output shaft for driving said traction means, said transmission including friction devices operable to establish a variable speed driving connection between said input and output shafts when said friction devices are selectively engaged; mounting means positioning said power take-off shaft for rotation on an axis in radially spaced relation to the axis of said drive shaft; a gear train including an input element connected in driven relation with said drive shaft, an output element in rotatable relation to said transmission input shaft, and intermediate gearing connecting said input element in driven relation with said output element; control means operable to connect said transmission input shaft in driven relation, selectively, with said input or output element of said gear train; and additional means connecting said power take-off shaft in driven relation with said intermediate gearing and operable independently of said control means.

9. In a transmission and power take-off system for motor vehicles having a traction means and a power take-off shaft; the combination of an engine; a drive shaft driven by said engine; a constant mesh change speed transmission having a power input shaft and a variable speed output shaft for driving said traction means, said transmission including friction devices operable to establish a variable speed driving connection between said input and output shafts when said friction devices are seletcively engaged; mounting means positioning said power take-off shaft for rotation on an axis in radially spaced relation to the axis of said drive shaft; an input element connected in driven relation with said drive shaft; an output element in rotatable relation to said transmission input shaft; an idler gear rotatably carried by said mounting means in mesh with one of said elements; a double section gear unit rotatably carried by said mounting means for rotation about an axis in radially spaced relation to the axis of said drive shaft, one section of said gear unit in mesh with said idler gear and the other section of said gear unit in mesh with the other of said elements; control means operable to connect said transmission input shaft in driven relation, selectively, with said input or output element; and additional means connecting said power take-off shaft in driven relation with said double section gear unit.

10. The combination set forth in claim 9 wherein said additional means comprises a power take-off gear in driven relation with said double section gear unit and clutch means operable to connect said power take-off shaft in driven relation with said power take-off gear; and further comprising an engine clutch operable to connect in driven relation said engine and said drive shaft.

References Cited in the file of this patent

UNITED STATES PATENTS

| 1,887,355 | Kranick | Nov. 8, 1932 |
| 1,944,685 | Floss | Jan. 23, 1934 |
| 2,237,322 | West | Apr. 8, 1941 |
| 2,287,279 | Stumpf | June 23, 1942 |
| 2,349,880 | Orelind | May 30, 1944 |